Feb. 17, 1942.　　　　E. F. MARTINET　　　　2,273,211
TUBULAR COUPLING
Filed Feb. 25, 1939
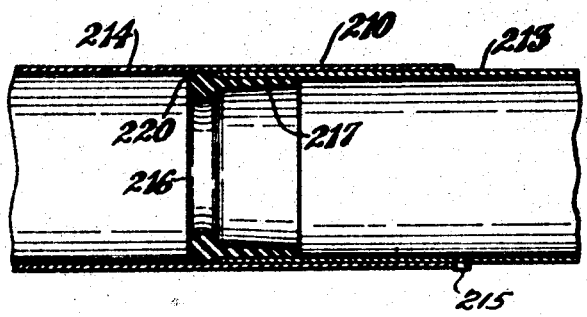
Inventor
Eugene F. Martinet
By Frease and Bishop
Attorneys Patented Feb. 17, 1942

2,273,211

UNITED STATES PATENT OFFICE 2,273,211

TUBULAR COUPLING

Eugene F. Martinet, Cleveland, Ohio, assignor to The P. A. Geier Company, Cleveland, Ohio, a corporation of Ohio Application February 25, 1939, Serial No. 258,373

1 Claim. (Cl. 285—192)

My invention relates to tubular couplings and closure sleeves therefor more particularly adapted for use in suction cleaners where separable air-tight connections are desired between attachment hose, tubes, nozzles and the like.

Telescoping couplings are frequently used in suction cleaners including two tubular members one of which telescopes within the other. The telescoping members may be straight tubular members with a stop to limit the length of the telescoping portions, or the inner tubular member may have an external taper for tightly fitting within the outer tubular member which may also be provided with an internal taper for fitting with the external taper on the inner tubular member.

Such slip joint couplings are difficult to make air-tight, and in use are likely to be knocked loose by the striking against a piece of furniture of a nozzle connected to a suction tube by such a slip joint, and which may cause a separation of the telescoping parts or in any event a leakage or air through the joint.

Where straight tubular members are used it is very difficult to obtain a satisfactory air seal.

The objects of the present improvements include the provision of an improved air sealed tubular coupling in which straight or tapered telescoping tubular members may be utilized if desired and which is adapted to have a greater resistance to the separation of the tubular members than in the ordinary telescoping coupling.

Further objects of the present improvements include the provision of an improved closure sleeve for tubular couplings which provides a substantially air-tight connection and resists separation of the tubular members of the coupling.

Further objects of the improvements include the provision of an air-tight closure sleeve for a tubular coupling preferably in the form of a one-piece resilient sleeve permitting economical manufacture and convenience in use.

The foregoing and other objects are attained by the tubular couplings, closure sleeves, parts, combinations, and sub-combinations, which comprise the present invention, and the nature of which is set forth in the following general statement and a preferred embodiment of which are set forth in the following description, and which are particularly and distinctly pointed out and set forth in the appended claims forming part hereof.

The nature of the improved tubular coupling and closure sleeve therefor of the present invention may be stated in general terms as including in combination with tubular coupling members which may be telescoping tubular sleeves, of an improved resilient preferably rubber closure sleeve located on one of the tubular members in air-tight engagement therewith, the rubber sleeve extending from the one tubular member beyond the end thereof in separable or removable air-tight engagement with the other tubular member when the tubular members are in connected position.

The improved closure sleeve includes an enlarged gripping ring portion which is thicker than the remaining body portion of the sleeve and which has a gripping or engaging surface of different diameter than that of the surface of the tubular member separably engaged thereby.

By way of example, an embodiment of the improved tubular coupling or connector including the improved closure sleeve is illustrated in the accompanying drawing forming part hereof, in which the figure illustrates an improved coupling having an internal closure sleeve.

Similar numerals refer to similar parts throughout the drawing.

In the figure, the improved coupling is indicated generally by 210 and includes telescoping inner and outer tubular members or connected suction tubes 213 and 214, which are associated with the suction cleaner, not shown, and which may be of any usual type such as a tank type suction cleaner.

The improved tubular coupling 210 includes a tubular member 213 and a tubular member 214 which are separable and which are registerable with each other for providing a passageway from the one into the other preferably by telescoping the tubular member 213 into the tubular member 214.

In the coupling 210 the telescoping tubular members 213 and 214 are straight tubes of uniform diameter and the length of the telescoping portions thereof is limited by stop means, as for example a pin 215 extending outwardly from the inner tube 213 and abuttable against the end of the outer tube 214.

The tubular members 213 and 214 are preferably made of rigid material such as metal.

The improved coupling 210 furthermore includes an improved resilient preferably rubber closure sleeve 216 including a body portion 217, making a circumferential closure on one of the two separable tubular members 213 and 214 and having an enlarged resilient gripping ring portion making a gripping closure engagement with the entire circumference of the other tubular member, In the coupling 210, the improved closure sleeve 216 is an internal closure sleeve whose body portion 217 telescopes into the tubular member 213 and extends beyond the end of the tubular member 213, where the whole of said extended portion provides an enlarged resilient gripping ring portion or mouth 220 engaging over said end of tubular member 213 and having a thickness substantially greater than the thickness of the body portion 217. The external circumference of the gripping ring mouth 220 is greater than the internal circumference of the tubular member 214 and greater than the external circumference of the remainder of the closure sleeve, whereby the gripping ring mouth 220 effects a substantially air-tight resilient circumferential closure engagement about the entire inner circumferential surface of the tubular member 214, not only providing an air sealed coupling, but also resisting accidental separation of the telescoped members 213 and 214 by bumps or jars, to which the coupling 210 may be subjected during ordinary use of the suction cleaner, of which it may be a part.

The improved closure sleeve 216 as shown, is preferably made entirely of resilient material, preferably in one piece. However, the improved closure sleeve 216 may be made in part of rigid or non-resilient material, but in any event the enlarged gripping ring portion or mouth 220 of the closure sleeve 216 is proportioned so as to effect a resilient closure engagement against the entire surface of the tubular member 214 when the tubular members 213 and 214 are telescoped together.

I claim:

A sealed tubular coupling for suction tubes including separable tubular members telescoped one within the other, and a closure sleeve having a body portion making a circumferential closure with the inner tubular member and having a resilient gripping ring end mouth at the end of said inner tubular member making a gripping closure with the entire inner circumference of the outer tubular member, said gripping ring end mouth being thicker than the closure sleeve body portion and having an external circumference normally greater than the inner circumference of said outer tubular member.

EUGENE F. MARTINET.